United States Patent Office

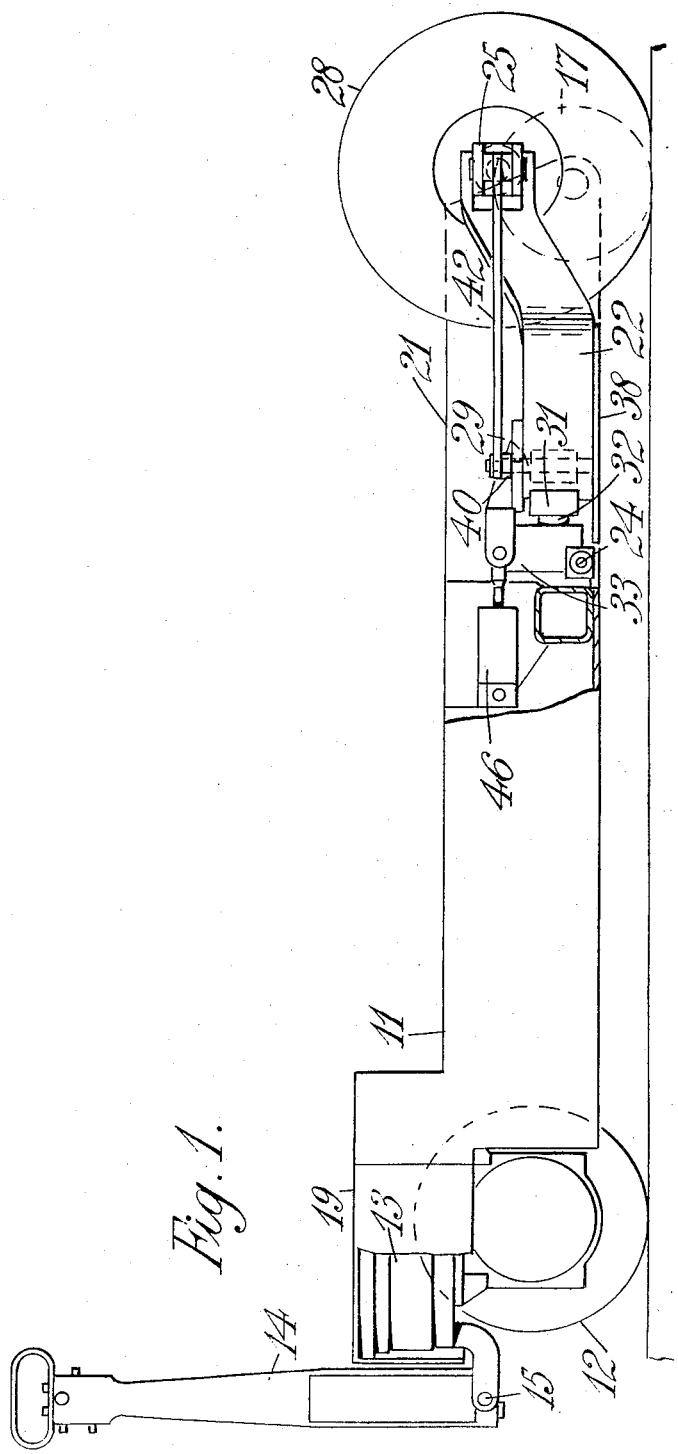

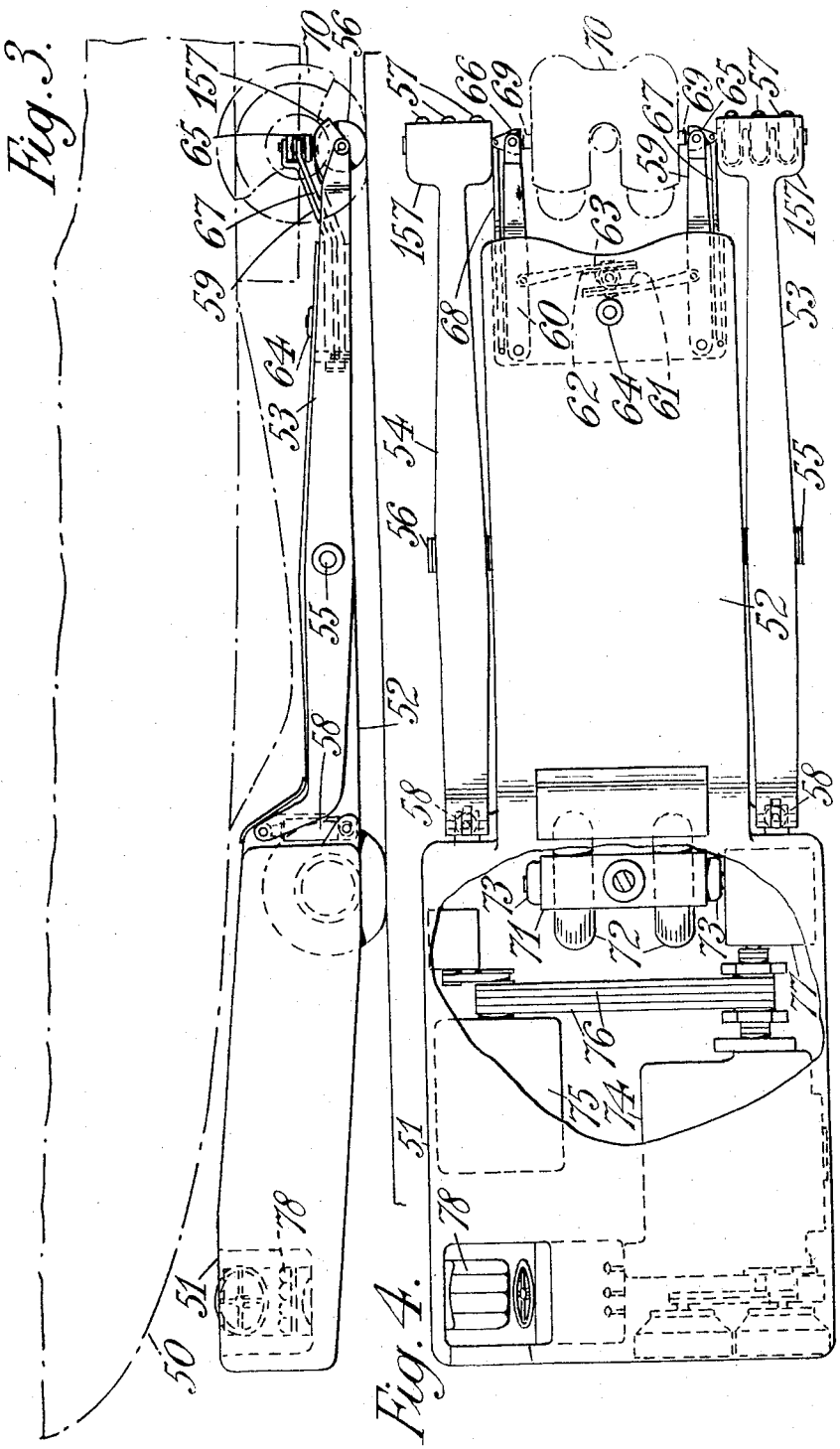

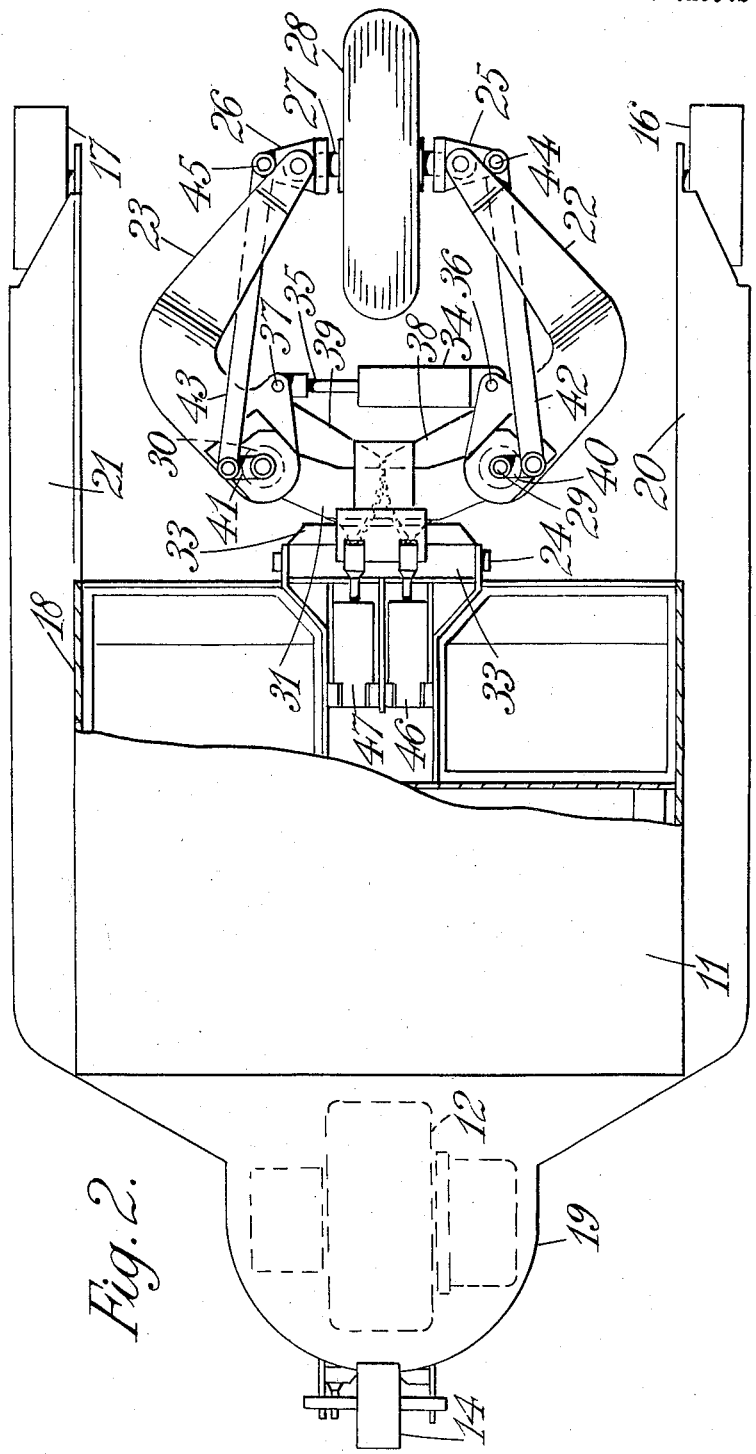

2,919,043
Patented Dec. 29, 1959

2,919,043

AIRCRAFT HANDLING DEVICES

John Reginald Sharp, Basingstoke, England, assignor of one-half to Emmanuel Kaye, Basingstoke, England Application June 13, 1956, Serial No. 591,222

Claims priority, application Great Britain June 16, 1955

5 Claims. (Cl. 214—653)

This invention comprises improvements in or relating to aircraft handling devices.

It is an object of the present invention to provide apparatus for facilitating the manoeuvring of aircraft in confined spaces upon the ground or the deck of an aircraft carrier or in a hangar. In U.S. Patent 2,732,088, there is described apparatus comprising a truck which is provided with means for lifting the steering wheel of the undercarriage of an aircraft, for example the nose wheel on a tricycle undercarriage, and having lifted the steering wheel, for manoeuvring the aircraft by moving the truck to push or draw the part of the aircraft which is supported by the steering wheel forward or back or sideways. The present invention relates to apparatus of the same general type. In the said Patent 2,732,088 the method adopted for lifting the steering wheel was to clamp a circular attachment ring around the wheel and to lift the ring by appropriate means so that it rested on a turntable on the truck.

According to the present invention a truck for the purpose described is provided which has two horizontally movable gripper arms, which are adapted to engage directly and grip firmly opposite sides of a castering part of the steering undercarriage of an aircraft; a convenient part to be so gripped in appropriate cases is the undercarriage wheel axle, at its two opposite ends.

According to a further feature of the invention the grippers are further hinged to the truck body in such manner as to be movable up and down relatively thereto. By this means the grippers may be used to lift the aircraft wheel, after they have been engaged with the axle thereof. Alternatively, the movement of the grippers may be used to lift part of the wheels of the truck clear of the ground so that the gripper end of the truck is supported by the aircraft undercarriage, after which steering movements of the aircraft can be effected by causing the truck and the steering wheel of the aircraft to swing laterally about the steering pivot of the steering wheel of the aircraft. In this way, in the case of large and heavy aircraft, lifting a substantial part of the weight of the aircraft, which may rest upon the aircraft steering wheel, is obviated, and only the much smaller weight of the gripper end of the truck has to be lifted. At the same time the movements of the aircraft can be steadied or stopped when necessary by applying a braking force to the aircraft ground wheel.

The following is a description by way of example of one construction in accordance with the invention.

In the accompanying drawings,

Figure 1 is a side elevation of a truck;

Figure 2 is a plan of the same;

Figure 3 is a side elevation of a larger truck, shown beneath an aircraft body; and Figure 4 is a plan of the truck shown in Figure 3.

Referring to Figures 1 and 2, a truck is provided having a low body portion 11 which is supported at one end upon a motor-driven castor wheel 12. The castor wheel 12 supports the truck body by means of a turntable 13 to which is attached a tiller arm 14 by a hinge at 15; this construction permits the wheel 12 to be steered in any direction relatively to the body of the truck. At the other end of the truck body are two small ground wheels 16, 17. The body 11 has a box-like centre part 18 with an elevated bracket 19 at the end over the turntable 13 and two box-section side arms 20, 21 which extend forwardly beyond the part 18 and carry the side wheels 16, 17.

Between the side arms 20, 21 there is pivoted a gripper mechanism which extends forward beyond the part 18 of the truck body. The gripper mechanism comprises two forwardly projecting arms 22, 23 which are mounted on the truck body so that they can swing up and down together about a horizontal pivot 24. The gripper arms carry pivoted jaws 25, 26 at their forward ends which are shaped to engage the ends of the axle 27 of the steering wheel 28 of an aircraft and are so hollowed out for this purpose that when they engage the ends of the axle they not only grip it firmly but centre themselves relatively to the axle.

The gripper arms 22, 23 are pivoted respectively at 29, 30 on the ends of a transverse yoke 31 which has a stem 32 entering a block 33 mounted on the pivot 24. The arms are connected together by a transverse hydraulic operating cylinder 34 and its piston rod 35, which are pivoted between the arms at 36, 37. They are made to move equally by two toothed segments 38, 39, secured one to each arm, which extend below the yoke 31 and mesh together.

The pivots 29, 30 are fixed in the yoke 31 and extend upwardly above the gripper arms 22, 23. Here they carry crank-arms 40, 41, connected by links 42, 43 to pivot pins 44, 45, on the jaws 25, 26. The distance of the pivot pins 44, 45, from the pivotal connections of the jaws to the gripper arms 22, 23 is equal to the lengths of the crank-arms 40, 41, and this linkage keeps the jaws pointing squarely towards one another during opening and closing movements of the gripper arms.

The gripper arms 22, 23, with their associated mechanism for moving them towards one another, can be canted up and down relatively to the truck body about the horizontal pivot 24 on which they are mounted, and one object of this movement is to bring the grippers on the arms to the correct level for engaging the aircraft steering wheel axle 27. To this end the pivoted block 33 is connected to the truck body by a pair of hydraulic jacks 46, 47 which serve to raise and lower them.

In use, with this apparatus, the gripper arms 22, 23, are first adjusted to the correct height and the truck is manoeuvred so that the jaws 25, 26 are in line with the axle 27 of the steering wheel 28 of the aircraft which is to be moved. The grippers are then closed upon the ends of the axle to hold it firmly. Thereupon the jacks 46, 47 which actuate the raising and lowering movement of the grippers is operated. If a light aircraft is concerned the grippers can be raised and so raise the steering wheel 28 of the aircraft off the ground. The aircraft can then be manoeuvred by a combined driving and steering movement of the wheel 12 controlled by the arm 14. It is, however, possible to operate the jacks in the opposite direction; the result is then that the grippers, which cannot push the steering wheel 28 of the aircraft downwardly because it is resting on the ground, cause the front wheels 16, 17, of the body of the truck to lift off the ground, and the truck is then supported at one end by its grippers on the aircraft and at the other end by its motor driven castor wheel 12. By rotating the castor wheel turntable 13 so that the plane of the castor wheel is at an angle (preferably a right-angle) to the plane of the aircraft steering wheel, and driving the castor wheel of the truck, the castor wheel will rotate the steering axis of the aircraft steering wheel into any desired orientation. Thereupon, if the castor wheel of the truck is steered by rotating the turntable, until its axis is parallel with the axis of the aircraft steering wheel, the castor wheel on being driven will move the aircraft undercarriage wheel 28 forward or backward, and steer the aircraft in accordance with the direction in which the aircraft steering wheel has been orientated.

It should be noted that when the truck is lifted in this way, a considerable part of the weight of the truck is carried upon the axle 27 of the aircraft steering wheel, and this tends to stabilise the aircraft in a wind. As the normal weight of the aircraft borne by the steering wheel is not transferred to the truck, the truck is relieved of unnecessary loading forces during manoeuvring operations.

Referring now to Figures 3 and 4, this shows a larger structure for operating below the fuselage of a large aircraft, shown in chain lines at 50, Figure 3.

The truck comprises a box-like body 51 having a lower central forwardly projecting portion 52. To the latter, arms 53, 54 are pivoted at 55, 56, one on each side. The arms extend forwardly and carry triple ground wheels 57 in housings 157. The rear ends of the arms are supported from the box-like portion 51 of the body by jacks 58. Thus the front portion 52 of the body can be raised and lowered relatively to the ground by extending or contracting the jacks 58.

In the front end of the portion 52 are pivoted two forwardly extending gripper arms 59, 60. Each gripper arm carries one of a pair of pivoted rack-rods 61, 62 and the racks mesh with a pinion 63 operated through a reduction gear by a reversible motor 64. The gripper arms carry jaws 65, 66 which are kept in mutual alignment by parallel links 67, 68. The jaws are adapted to fit over the ends of an axle 69 of an undercarriage steerable twin-wheel mounting 70, shown in chain lines.

The box-like body 51 is supported on a steerable twin-wheel bogie 71 carrying wheels 72 driven by motors 73. In the body 51 is a diesel-engine 74 driving a dynamo 75 by belts 76 and a hydraulic pump 77. The whole is controlled and steered from a seat 78 let into the body at the end. The operation is similar to that of Figures 1 and 2. As this truck is intended for operating on heavy aircraft the intended method of operation is by operating jacks 58 to draw down the rear ends of levers 53 and raise the wheels 57. The weight of the front part of the truck is then transmitted by the grippers to the aircraft wheels 70.

I claim:
1. A truck for handling aircraft comprising in combination a body, steerable supporting wheels for said body, said body having a forwardly extending portion in front of said steerable wheels, forwardly reaching gripper arms on said forwardly extending portion mounted to be closable horizontally toward one another, means for closing said gripper arms, side levers pivoted one on each side of said forwardly extending body portion and extending forwardly from their pivot outside the gripper arms, ground wheels on said side levers, and means for moving the side levers up and down about their pivots.

2. A truck as claimed in claim 1 wherein the body has a seat, the steerable supporting wheels are power driven and steering means are provided to steer the wheels from the seat.

3. A truck as claimed in claim 1 wherein the side levers are power actuable by piston-and-cylinder means.

4. A truck as claimed in claim 1 wherein the means for closing the gripper arms towards one another are power actuable by piston-and-cylinder means.

5. A truck for handling aircraft, comprising in combination a body having a rear portion and a forwardly extending portion rigidly united thereto, steerable supporting wheels beneath said rear portion, power driving means on said rear portion for said wheels, side levers pivoted one on each side of said forwardly extending portion and extending forwardly from their pivot point, ground wheels on said side levers, power means for lifting and lowering the side levers relatively to the body portion, a pair of grippers forwardly extending from the body portion between the side levers, and grippers being movable transversely to the body toward and away from one another, and power means for operating the grippers.

References Cited in the file of this patent

UNITED STATES PATENTS

| | | |
|---|---|---|
| 1,884,861 | Remde | Oct. 25, 1932 |
| 2,226,789 | Tupy | Dec. 31, 1940 |
| 2,287,955 | Zunino | June 30, 1942 |
| 2,411,061 | Saxon | Nov. 12, 1946 |
| 2,685,976 | Ulinski | Aug. 10, 1954 |
| 2,725,998 | Huff | Dec. 6, 1955 |
| 2,732,088 | Arnot | Jan. 25, 1956 |
| 2,758,734 | Westling | Aug. 14, 1956 |